United States Patent [19]

Puckett

[11] 4,006,952
[45] Feb. 8, 1977

[54] BATTERY JUMP CABLE APPARATUS

[76] Inventor: William E. Puckett, 105 W. Charlotte Drive, Oklahoma City, Okla. 73159

[22] Filed: May 10, 1976

[21] Appl. No.: 684,652

[52] U.S. Cl. .......................... 339/5 RL; 174/52 R; 191/12.4; 242/107.13; 339/148
[51] Int. Cl.² ..................................... H01R 39/00
[58] Field of Search ............. 339/5 RL, 5 R, 5 M, 339/10, 148, 224, 225, 228; 174/52 R X; 191/12.4 X; 242/107.13 X

[56]    References Cited
        UNITED STATES PATENTS

| | | | |
|---|---|---|---|
| 2,547,777 | 4/1951 | Ray | 242/107.13 |
| 2,629,630 | 2/1953 | Roark | 242/107.13 X |
| 3,337,695 | 8/1967 | Brown | 191/12.4 |
| 3,700,834 | 10/1972 | Schaefer | 174/52 R X |

Primary Examiner—Roy Lake
Assistant Examiner—DeWalden W. Jones
Attorney, Agent, or Firm—Dunlap, Codding & McCarthy

[57] ABSTRACT

Apparatus for transferring power from the battery of a service vehicle to the battery of a second vehicle, wherein the negative battery terminal of the service vehicle is connected to the frame of the service vehicle, which utilizes a spring-loaded reel for storing the jumper cables in the service vehicle and where one of the cables is permanently connected to the frame of the service vehicle and the other cable is permanently connected to the positive terminal of the battery in the service vehicle. The reel is preferably positioned in the rear of the service vehicle, whereby the vehicles may be aligned with the traffic when the apparatus is being utilized to start a stalled vehicle.

10 Claims, 7 Drawing Figures

4,006,952

BATTERY JUMP CABLE APPARATUS

BACKGROUND OF THE INVENTION

1. Field of the Invention

This invention relates to improvements in apparatus for connecting the battery of a service vehicle to the battery of a second stalled vehicle.

2. Description of the Prior Art

It is well known that automobile batteries cease to function at most inopportune times, frequently resulting in an automobile being stalled on a heavily traveled road. The normal solution to this problem is for a service vehicle to be dispatched to the site of the stalled vehicle and then maneuvered around to face the stalled vehicle, in order that jumper cables can be extended between the battery of the service vehicle and the battery of the stalled vehicle. The maneuvering of the service vehicle to be in facing relation to the stalled vehicle frequently interrupts the traffic flow and the connection and disconnection of the jumper cables is a time consuming operation.

The prior art, such as is shown in U.S. Pat. No. 3,337,695 of W. R. Brown and U.S. Pat. No. 3,700,834 issued to Cyril L. Schaefer discloses the concept of storing jumper cables on reels. However, prior to the present invention, the prior art systems have not been satisfactory and have not been used to any appreciable extent. Generally, the prior art requires the connection of one set of portable cables to the battery of a service vehicle and the connection of the other end of the portable cables to the battery of the stalled vehicle, resulting in an appreciable length of time to start the stalled vehicle. It is the nature of a lead acid battery (commonly used in automobiles) to yield hydrogen gas as a result of current flow either into or out of the battery. The hydrogen gas when mixed with the ambient air environment above the battery is very easily ignited if a spark from connecting or disconnecting a "live" battery cable should occur. Such ignition can result in a damaging and possibly fatal explosion. Also, the prior art has not taught the positioning of the jumper cable storage reel in such a position that the service vehicle can simply be aligned in the same direction with the stalled vehicle to perform the starting operation with a minimum of interruption to the traffic flow.

SUMMARY OF THE INVENTION

An object of this invention is to provide an apparatus by means of which a vehicle which has been stalled by virtue of a dead battery can be restarted in a minimum of time.

Another object of this invention is to provide an apparatus for starting a stalled vehicle with a dead battery with the minimum of interruption of traffic flow in the area of the stalled vehicle.

A further object of this invention is to provide an apparatus for starting a stalled vehicle with a dead battery which is economical in construction and easy to operate with safety.

An additional object of this invention is to provide an apparatus for starting a stalled vehicle with a dead battery and provide a non-sparking temporary battery connection.

Other objects and advantages of the invention will be evident from the following detailed description when read in conjunction with the accompanying drawings which illustrate a preferred embodiment.

DETAILED DESCRIPTION OF THE PREFERRED EMBODIMENT

Figure 1:
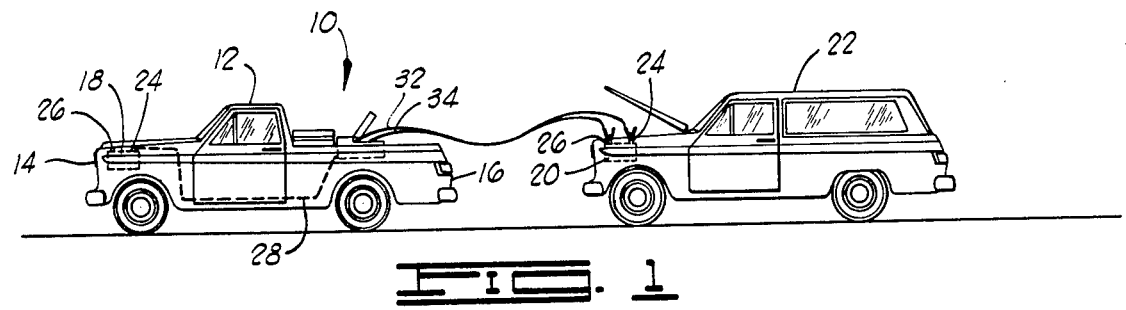
FIG. 1 is a side elevational view of a service vehicle and a stalled vehicle aligned in similar orientation to the normal traffic flow and spatial relationship of the service vehicle and the stalled vehicle using this invention in the preferred embodiment.

Referring now to FIG. 1 of the drawings, there is shown an apparatus, generally referred to by the numeral 10, mounted in a service vehicle 12. The vehicle 12 has a front end 14 and a rear end 16 and the apparatus 10 is located toward the rear 16 of the service vehicle 12. The apparatus 10 is used for the transferring of electrical power from a service battery 18 of the service vehicle 12 through the apparatus 10 to a dead battery 20 of a stalled vehicle 22.

The batteries 18 and 20 each have positive and negative terminals 24 and 26, respectively. As is common among manufacturers of automobiles, trucks, and the like, it will be noted that whereas the positive terminal 24 of the battery 18 in the service vehicle 12 is connected to the apparatus 10 by means of a cable 28, the negative terminal of the battery 18 is connected to the body and frame of the service vehicle 12 by a factory installed "ground cable" (not shown) for the negative electrical path.

Still referring to FIG. 1 it will be noted that a positive flying cable 32 is attached to the positive terminal 24 of the battery 20 of the stalled vehicle 22, and a negative flying cable 34 is attached to the negative terminal of the battery 20 of the stalled vehicle 22. The flying cables 32 and 34 and their attaching devices will be further explained below. As can be readily seen from reference to FIG. 1, the objects of this invention can be achieved by the installation of the apparatus 10 in the rear 16 of the service vehicle 12 when used in accordance with the method herein taught.

Figure 3:
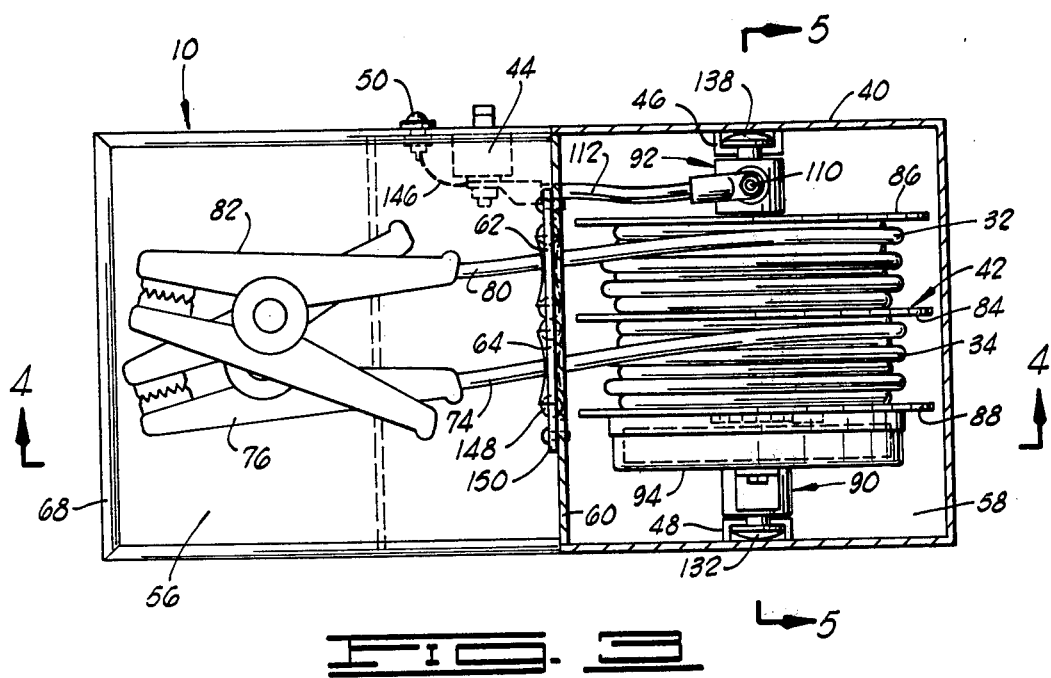
FIG. 3 is a plan view of the cable housing and reel assembly of the present invention with the covers and hinge removed.

Referring now to FIG. 3, which is a plan view of the apparatus 10 with the cover removed, it is evident that the apparatus 10 comprises: a housing 40; the first flying cable 34 (hereinafter referred to as the negative cable); the second flying cable 32 (hereinafter referred to as the positive cable); a rotatably supported reel 42; an on-off thermal switch 44; a pair of reel support brackets 46 and 48, and an indicator light 50. Each of these components will be discussed in turn, with a subsequent description of both the positive and negative electrical paths following.

Figure 4:
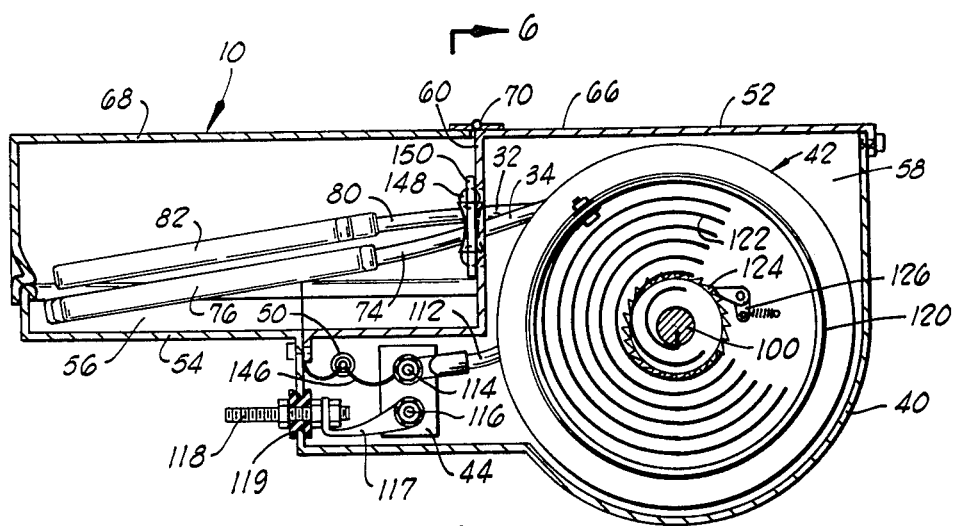
FIG. 4 is a sectional view taken along lines 4—4 in FIG. 3.
Figures 5, 6:
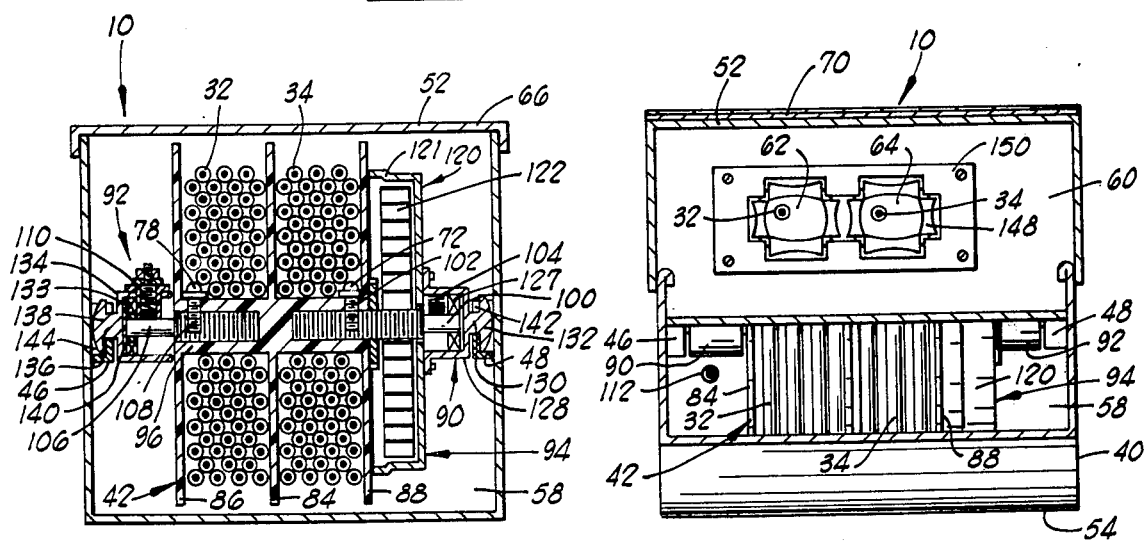
FIG. 5 is a sectional view taken along lines 5—5 of FIG. 3.
FIG. 6 is a sectional view taken along lines 6—6 of FIG. 4.

The housing 40 is comprised (see FIG. 4) of a top 52 and a bottom 54; a nest section 56 and a closed section 58, with the two sections 56 and 58 being divided by a wall 60 having apertures 62 and 64 as shown in FIG. 6. The top 52 comprises a removable cover 66 attached by conventional screws, or the like to bottom 54 of the housing 40, and a hinged cover 68, which is joined to the removable cover 66 by a typical piano hinge 70, or the like. The hinged cover 68 forms the upper portion of the nest section 56, which houses the face ends (to be later discussed) of the positive and negative cables 32 and 34 when not in use. The bottom being both normally and arcuately formed, the hinged cover 68 provides a covering for the next section 56 and the removable cover 66 provides a covering for the arcuately formed closed section 58.

The negative cable 34, wound on the reel 42, has a first end 72 (FIG. 5) thereof secured to the reel 42 and an opposite free or flying end 74 (FIG. 4). Attached to the free end 74 of the negative cable 34 is a clamp 76 of conventional and well known design for attaching the flying negative cable 34 to the negative terminal 26 of the battery 20 of the stalled vehicle 22. The first end 72 of the negative cable 34 will be explained further in the discussion of the reel 42 to follow.

The positive cable 32, wound on the reel 42, has a first end 78 (FIG. 5) thereof secured to the reel 42 and an opposite free or flying end 80 (FIG. 4). Attached to the free end 80 of the positive cable 32 is a clamp 82 of conventional and well known design for attaching the flying positive cable 32 to the positive terminal 24 of the battery 20 of the stalled vehicle 22. The first end 78 of the positive cable 32 will be explained further in the discussion of the reel 42 to follow.

The reel 42 comprises a spool 84 with a positive side 86, a negative side 88, corresponding support devices 90 and 92 and a spring return mechanism 94, and will be discussed as such. The spool 84 is constructed of a non-conductive material such as fiberglass or the like having the necessary strength characteristics to withstand the pressures to which it will be subjected. The hub 96 of the spool 84 is provided with a bore in the negative side 88 to receive an electrically conductive support shaft 100 held in place by a threaded screw 102 which also provides the means for securing the first end 72 of the negative cable 34 to the reel 42. The screw 102 also provides an electrical path from the negative cable 34 through the threaded screw 102, through the electrically conductive support shaft 100 to a carbon brush 104 of commercial and conventional design.

The hub 96 of the spool 84 is provided with a bore in the positive side 86 to receive an electrically conductive support shaft 106 held in place by a threaded screw 108 which also provides the means for securing the first end 78 of the positive cable 32 to the reel 42. The screw 108 also provides an electrical path from the positive cable 32 through the threaded screw 108 through the electrically conductive support shaft 106 to a carbon brush and insulated post device 110 of commercial and conventional design. The device 110 is in turn electrically connected by a short jumper cable 112 (FIGS. 3 and 4) to a first post 114 of the switch 44. The switch 44 is a manually operated on-off thermal switch with over-current protection to prevent excessive current withdrawal from the service vehicle battery 18. Upon the manual operation from "off" to "on" position of the switch 44, electrical continuity is obtained through the switch 44 from the first post 114 to a second post 116. The post 116 is in turn electrically connected by a jumper cable 117 to a terminal post 118 secured by an insulating grommet 119 through the bottom 54 of the housing 40. The terminal post 118 is in turn permanently electrically connected to the positive terminal 24 of the service vehicle battery 18 by cable 28 as indicated in FIG. 1.

The negative side 88 of the spool 84 has juxtaposed a cable return mechanism 120 comprised of a spring housing 121, a convoluted spring 122, a ratchet 124, and a self-actuated spring biased stop 126. The spring 122 urges rewinding of the reel 42 by energy stored by prewinding the spring 122, the spring being anchored between the spring housing 120 and the reel 42. The prewinding, of course, is performed during assembly of the apparatus 10. The stop 126 provides a holding means for the spool 84 in any desired position.

The negative side support shaft 100 is supported by a bearing 127 within a journal bracket 128. The journal bracket 128 includes a flat sided shaft 130 and a head 132. The spring housing 121 is attached to the journal bracket 128 by conventional screws. The positive side support shaft 106 is supported by a bearing 133 within a journal bracket 134. The journal bracket 134 includes a flat sided shaft 136, a head 138 and an insulator 140. The primary difference between the journal brackets 128 and 134 are a result of the electrical requirements whereas the negative side does not require insulation and whereas the positive side must be continually insulated throughout its path.

The pair of reel support brackets 46 and 48 are permanently affixed (welded or the like) to the inside of the housing 40, so as to support the reel 42 in a position to freely rotate within the arcuately formed closed section 58. Each of the brackets 46 and 48 includes a slot 142 open-ended at the top and of a size to nestingly and removably receive the respective flat side shafts 130 and 136 of the journal brackets 128 and 134 in order to prevent rotation of the journal brackets 128 and 134. Each of the reel support brackets 46 and 48 also incorporates an openended socket 144 communicating with the slot 142 and of a size to receive the respective head 132 or 138 and whereby the reel 42 may be removed from the housing 40.

As shown in FIG. 4, the indicator light 50 is located in close proximity to the switch 44 and has a short insulated jumper 146 connected to the first post 114 of the switch 44 designed for a low current but of a sufficient magnitude to provide for the required current transfer to the indicator light 50 when the switch 44 is in the "on" position.

Referring now to FIG. 6, it will be observed that provided in the wall 60 are the apertures 62 and 64, aperture 62 being in cable de-reeling alignment with the positive cable 32 and aperture 64 being in cable de-reeling alignment with the negative cable 34. It will also be noted that each of the apertures 62 and 64 are surrounded by a series of four individual rollers 148 having their center points located at the 90°, 180°, 270°and 360° compass points as relates to the aperture they surround. Each of the rollers 148 is rotatably mounted on an axle plate 150 which is attached to the wall 60 by conventional attaching screws or the like, such rollers 148 to guide the positive and negative cables 32 and 34 as the cables 32 and 34 are wound onto and from the reel.

When it is desired to start the stalled vehicle 22 having a dead battery 20, the service vehicle 12 is driven to the location of the stalled vehicle and easily aligned with the stalled vehicle as illustrated in FIG. 1. Since the positive and negative terminals 24 and 26 of the service vehicle batter 18 are permanently connected to the apparatus 10, it is only necessary to connect the apparatus 10 to the stalled vehicle battery 20. This is accomplished by simply raising the hinged cover 68 and unreeling the cables 32 and 34 a sufficient distance to connect the clamps 76 and 82 to the positive and negative terminals of the dead battery 20. The operator then turns the switch 44 "on" to charge the dead battery. The indicator light 50 will indicate the existence of the charging current.

The negative electrical path of current continuity is as follows: from the negative terminal 26 of the battery 18 of the service vehicle 12 via the factory installed ground cable (not shown) to the frame of the service vehicle 12; thence to the housing 40 of the apparatus 10 through the bracket 48 and bracket 90 to the carbon brush 104; to the negative support shaft 100 through the threaded screw 102 to the first end 72 of the negative flying cable 34; to the negative terminal 26 of the battery 20 of the stalled vehicle 22 through the cable 34 and clamp 76.

The positive electrical path of current flow is as follows: from the positive terminal of the battery 18 of the service vehicle 12 via cable 28, terminal 118 and cable 117 to the second post 116 of the switch 44; through the switch 44 (when in the "on" position) to the first post 114 through the short jumper cable 112 to the carbon brush, insulator and post assembly 110, thence to the positive support shaft 106, through the threaded screw 108 to the first end 78 of the positive flying cable 32 to the positive terminal 24 of the battery 20 of the stalled vehicle 22 through the cable 32 and clamp 82.

When the stalled vehicle is started, the switch 44 is turned "off" to isolate the cables 32 and 34 from the service vehicle battery 18. Then the clamps 76 and 82 are disconnected from the battery 20. With a slight pull on the cables 32 and 34, the ratchet and stop 124 and 126 releases and the spring 122 rewinds the cables 32 and 34 on the reel 84.

Figure 2:
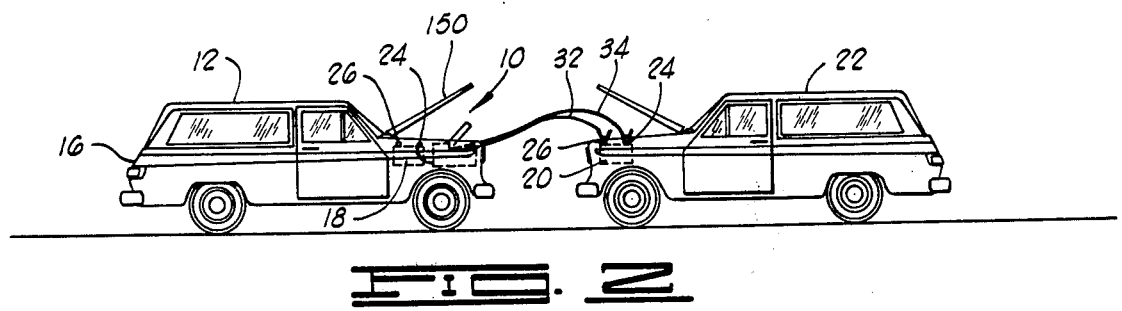
FIG. 2 is a side elevational view of a service vehicle and a stalled vehicle and their spatial relationship using another embodiment of the present invention.

FIG. 2 is included to illustrate another mode of installation of the apparatus 10 in the event the apparatus 10 cannot be conveniently mounted in the rear of the service vehicle. As indicated, the apparatus 10 may be installed under the hood 150 is desired and utilized in the same manner as previously described, except that the service vehicle must then be facing the stalled vehicle.

Figure 7:
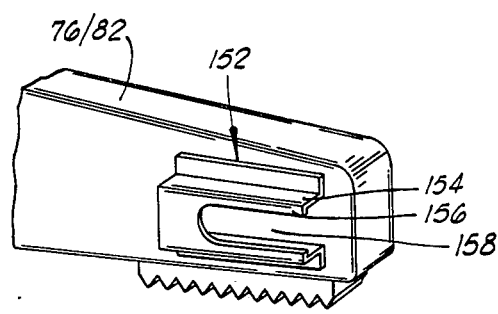
FIG. 7 is a partial perspective view of a cable clamp of the type for connection with a side located battery terminal.

FIG. 7 illustrates an attachment 152 which may be attached to the side of either or both of the cable clamps 76 or 82 to facilitate the connection of the apparatus 10 to a battery of the type which has side-mounted terminals. The attachment 152 comprises a generally U-shaped plate 154 having a bight portion 156 raised from the side of the respective clamp 76 or 82 and provided with a slot 158 sized to closely fit over the battery terminal.

Changes may be made in the construction and the arrangement of the parts or the elements of the various embodiments as disclosed herein without departing from the spirit and scope of the invention as defined in the following claims.

What is claimed is:

1. Apparatus for transferring power from the battery, having positive and negative terminals, of a service vehicle to the battery, having positive and negative terminals, of a second vehicle where the negative terminal of the service vehicle battery is connected to the frame of the service vehicle, comprising:

a housing secured to the service vehicle;
a reel rotatably supported in the housing;
a first cable wound on the reel having one end thereof secured to the reel and an opposite free end;
means electrically connecting the end of the first cable connected to the reel to the frame of the service vehicle;
a clamp connected to the free end of the first cable for connection with the negative terminal of the battery of the second vehicle;
a second cable wound on the reel having one end thereof connected to the reel and an opposite free end;
means electrically connecting the end of the second cable connected to the reel to the positive terminal of the service vehicle battery; and
a clamp on the free end of the second cable for connection with the positive terminal of the battery of the second vehicle 2. Apparatus as defined in claim 1 wherein the service vehicle has a front end and a rear end and said housing is mounted in the rear end of the service vehicle.

3. Apparatus as defined in claim 1 wherein said housing has a top and a bottom and comprises two sections divided by a wall, said reel being mounted in one section of the housing and said clamps being stored in the other section of the housing with said cables extending through mating apertures in said wall, and said other section including a hinged top whereby said clamps are accessible by raising the hinged top.

4. Apparatus as defined in claim 3 characterized further to include rollers supported around said apertures to guide the cables as the cables are wound onto and from the reel.

5. Apparatus as defined in claim 1 characterized further to include a spring anchored between said housing and said reel urging the reel in a direction to wind the cables on the reel.

6. Apparatus as defined in claim 1 characterized further to include a support shaft secured to each end of the reel, a bracket rotatably mounted on the end of each of said support shafts opposite the reel, and a pair of brackets secured in the housing in positions to engage and removably support the first mentioned brackets, whereby the reel may be lifted from the housing.

7. Apparatus as defined in claim 6 wherein each of the first mentioned brackets includes a flat sided shaft and a head on one end of the flat sided shaft, and wherein each of the second mentioned brackets includes an openended slot of a size to receive the respective flat sided shaft and prevent rotation of the respective flat sided shaft, and wherein each of the second mentioned brackets includes an open-ended socket communicating with the respective slot of a size to receive the respective head.

8. Apparatus as defined in claim 1 wherein the means electrically connecting one end of the second cable to the positive terminal of the service vehicle battery includes means to prevent excessive current flow to and from the service vehicle battery.

9. Apparatus as defined in claim 8 wherein the last mentioned means includes a thermal switch.

10. Apparatus as defined in claim 1 wherein the means electrically connecting one end of the second cable to the positive terminal of the service vehicle battery includes a manually controlled on-off switch.

* * * * *